US008626765B2

(12) United States Patent
Duan et al.

(10) Patent No.: US 8,626,765 B2
(45) Date of Patent: Jan. 7, 2014

(54) PROCESSING DATABASE OPERATION REQUESTS

(75) Inventors: Ning Duan, Beijing (CN); Bo Gao, Beijing (CN); Zhong Bo Jiang, Beijing (CN); Kai Tang, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 12/870,441

(22) Filed: Aug. 27, 2010

(65) Prior Publication Data

US 2011/0055151 A1    Mar. 3, 2011

(30) Foreign Application Priority Data

Aug. 27, 2009   (CN) .......................... 2009 1 0170957

(51) Int. Cl.
*G06F 15/16* (2006.01)
*G06F 17/20* (2006.01)

(52) U.S. Cl.
USPC .......................................... 707/737; 707/782

(58) Field of Classification Search
USPC .......................................... 707/610, 737, 782
See application file for complete search history.

(56) References Cited

U.S. PATENT DOCUMENTS

| | | | |
|---|---|---|---|
| 6,523,036 B1 * | 2/2003 | Hickman et al. ............... | 707/704 |
| 6,829,610 B1 * | 12/2004 | Hickman et al. ....................... | 1/1 |
| 6,862,593 B2 | 3/2005 | Walters | |
| 7,146,365 B2 | 12/2006 | Allen et al. | |
| 7,340,447 B2 | 3/2008 | Ghatare | |
| 7,475,055 B2 | 1/2009 | Hutchison et al. | |
| 2004/0193622 A1 * | 9/2004 | Peleg et al. ................... | 707/100 |
| 2004/0230552 A1 | 11/2004 | Smith et al. | |
| 2005/0047343 A1 * | 3/2005 | Sharony et al. ................ | 370/235 |
| 2005/0114303 A1 * | 5/2005 | Barsness et al. .................. | 707/3 |
| 2006/0190460 A1 | 8/2006 | Chandrasekaran et al. | |
| 2007/0016558 A1 | 1/2007 | Bestgen et al. | |
| 2007/0208750 A1 | 9/2007 | Carmeli et al. | |
| 2008/0071755 A1 | 3/2008 | Barsness et al. | |
| 2008/0189239 A1 | 8/2008 | Bawa et al. | |
| 2008/0263001 A1 | 10/2008 | Lohman et al. | |
| 2009/0077011 A1 * | 3/2009 | Natarajan et al. ................. | 707/2 |
| 2009/0089334 A1 * | 4/2009 | Mohamed et al. ............ | 707/200 |

FOREIGN PATENT DOCUMENTS

| | | |
|---|---|---|
| CN | 101030226 A | 9/2007 |
| CN | 101124546 A | 2/2008 |
| CN | 101446966 A | 6/2009 |

OTHER PUBLICATIONS

Chen, Qiming et al., User Defined Partitioning—Group Data Based on Computation Model, Data Warehousing and Knowledge Discovery: 10th International Conference, 2008, p. 389-401, v 5182 LNCS, Springer Verlag, Palo Alto CA US.

Wei, Ye, Internet Era Software Revolution: SaaS Architecture Design, Jan. 1, 2009, Electronic Industry Publishing House, English translation of Abstract.

* cited by examiner

*Primary Examiner* — Alex Gofman
(74) *Attorney, Agent, or Firm* — Jordan IP Law, LLC (57) ABSTRACT

A method and system for processing database operation requests, the method comprising: receiving a database operation request from a user; determining whether the database operation request is a heavy-duty request; if the database operation request is a heavy-duty request, routing the database operation request to a heavy-duty request database partition for processing heavy-duty requests to be processed, and recording the data scope affected by the database operation request into a metadata repository, wherein the heavy-duty request database partition is set besides an original normal database partition.

17 Claims, 6 Drawing Sheets

| FIG. 3A | FIG. 3B |

PROCESSING DATABASE OPERATION REQUESTS

FIELD OF THE INVENTION

The present application relates to the field of data processing, particularly, to a processing database requests in an SaaS system.

BACKGROUND OF THE INVENTION

The objective of SaaS (Software as a Service) systems is to use software as a service to reduce users' purchase and maintenance costs of software. In the SaaS environment, a large number of users (tenants) share application instances and a database.

However, since the database system is shared among different tenants in the SaaS environment, heavy-duty database operations of one tenant may affect other tenants' normal use. Some operations in the database system, e.g., on-boarding of a tenant, data import/export, data migration, data backup/restore and the like during its operation, will occupy a large amount of disk I/O and CPU capacity, thus affecting the system's performance in processing other tenants' requests. A large scale data migration or import may last several hours, during which, the response time to requests of other tenants may be increased, or other tenants could even be unable to access the system normally, which is unacceptable for the other tenants.

Traditionally, the most common method for solving the problem is to process heavy duty requests asynchronously. In this method the system finds idle time to process heavy-duty requests to avoid affecting normal processing. However, such a manner of delayed response is unacceptable from the point of view of business requirements. In the SaaS environment, the tenant may not even be willing to agree to asynchronous processing of heavy duty requests. That is to say, in most situations, heavy-duty requests need to be responded to in real time, rather than being processed offline or asynchronously.

Another method is to perform rate control on tenant operations, for example, limiting the maximum amount of resources that each tenant can use. However, this prevents the resource utilization from being maximized, and the maximum sharing capability of the system can not be achieved from the perspective of the whole system. In the SaaS environment, resource utilization is a key consideration, and usually, it is necessary to maximize the resource utilization.

Therefore, the field needs a more effective method and apparatus for isolating performance influence of application database operations among tenants of the SaaS application.

SUMMARY OF THE INVENTION

In one aspect of the present application, a method is provided for processing database operation requests, comprising: receiving a database operation request from a user; determining whether the database operation request is a heavy-duty request; if the database operation request is a heavy-duty request, routing the database operation request to a heavy-duty request database partition for processing heavy-duty requests to be processed, and recording the data scope affected by the heavy-duty database operation request into a metadata repository, wherein the heavy-duty request database partition is set besides an original normal database partition.

In another aspect of the present invention, there is provided a system for processing database operation requests, including: a request analyzer for receiving a database operation request from a user and for determining whether the database operation request is a heavy-duty request; and a request processor for, if the database operation request is a heavy-duty request, routing the database operation request to a heavy-duty request database partition for processing heavy-duty requests to be processed, and recording the data scope affected by the heavy-duty database operation request into a metadata repository, wherein the heavy-duty request database partition is set besides an original normal database partition.

The present invention provides an effective method for isolating performance influence among tenants: for tenants that do not have any heavy-duty requests, all their requests are directly routed to a normal database partition, not affected in any way by the processing of heavy-duty requests on a heavy-duty request database partition; the heavy-duty request will get a real time response, rather than a delayed response; the whole system performance is improved, since the heavy-duty requests are routed to a backup partition, and the whole system performance is improved. The method can be easily integrated with the application, and the application can get the benefits of isolating performance influence without any changes or with only a few changes.

BRIEF DESCRIPTION OF THE ACCOMPANYING DRAWINGS

The appended claims set forth the inventive features considered characteristic of the present invention. However, the invention itself and its preferred embodiments, objects, features and advantages will be better understood by referring to the detailed description below of the exemplary embodiments when read in conjunction with the accompanying drawings, in which:

DETAILED DESCRIPTION OF PREFERRED EMBODIMENTS

Embodiments of the present invention will now be described with reference to the accompanying drawings. In the following description, numerous details are described to enable the present invention to be fully understood. However, it is obvious to those skilled in the art that the realization of the present invention can be achieved without some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

According to one embodiment, the present invention provides a method for isolating performance influence among tenants. Performance influence of heavy-duty database operations is isolated among tenants by partitioning the database and routing heavy-duty requests and the normal requests to different partitions. In this method, an additional database node is obtained by partitioning the database, and the additional database node, which can be referred to as a heavy-duty request database partition, is used to temporally store the data generated by the heavy-duty request. The normal database partitions always process normal requests, as the application is running normally, while the heavy-duty request database partition is dedicated to process heavy-duty requests. In this way, the normal request processing is separated from the heavy-duty request processing, so that the performance impact of a heavy-duty request processing on the normal request processing is avoided.

Figure 1:
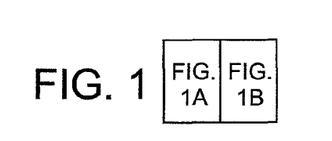
FIG. 1 is a block diagram illustrating a system for isolating performance influence of application database operations among SaaS tenants according to an embodiment of the present invention.
Figure 1A:
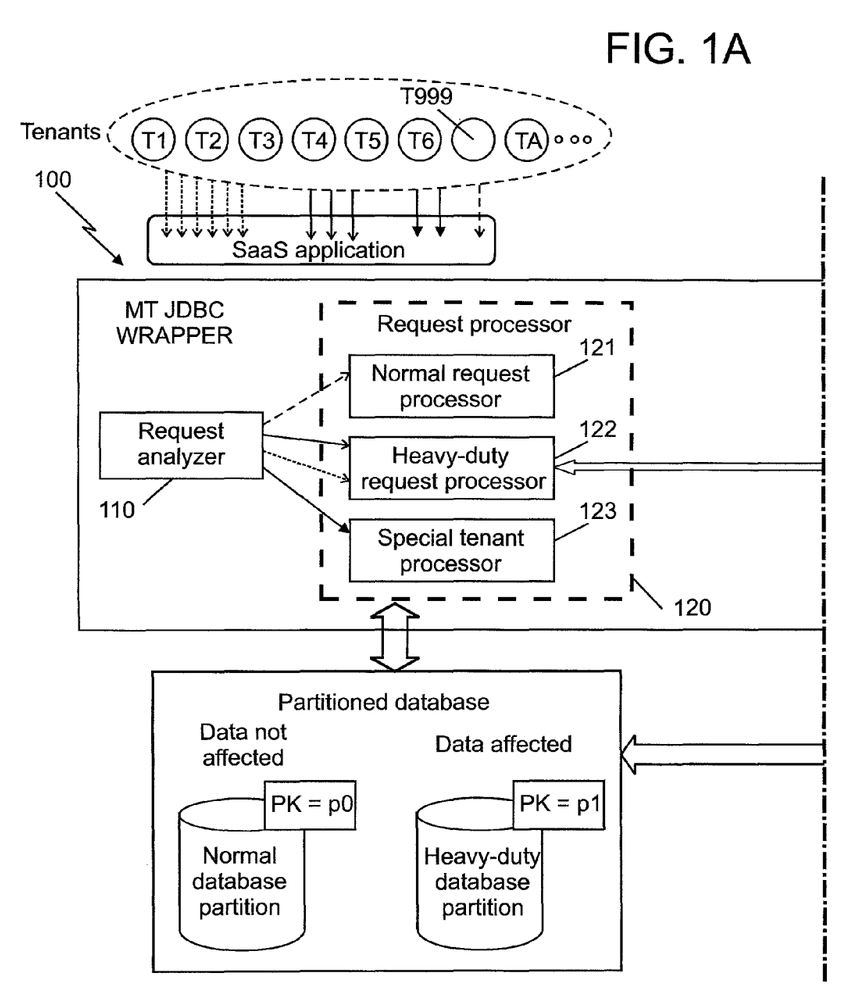
Figure 1B:
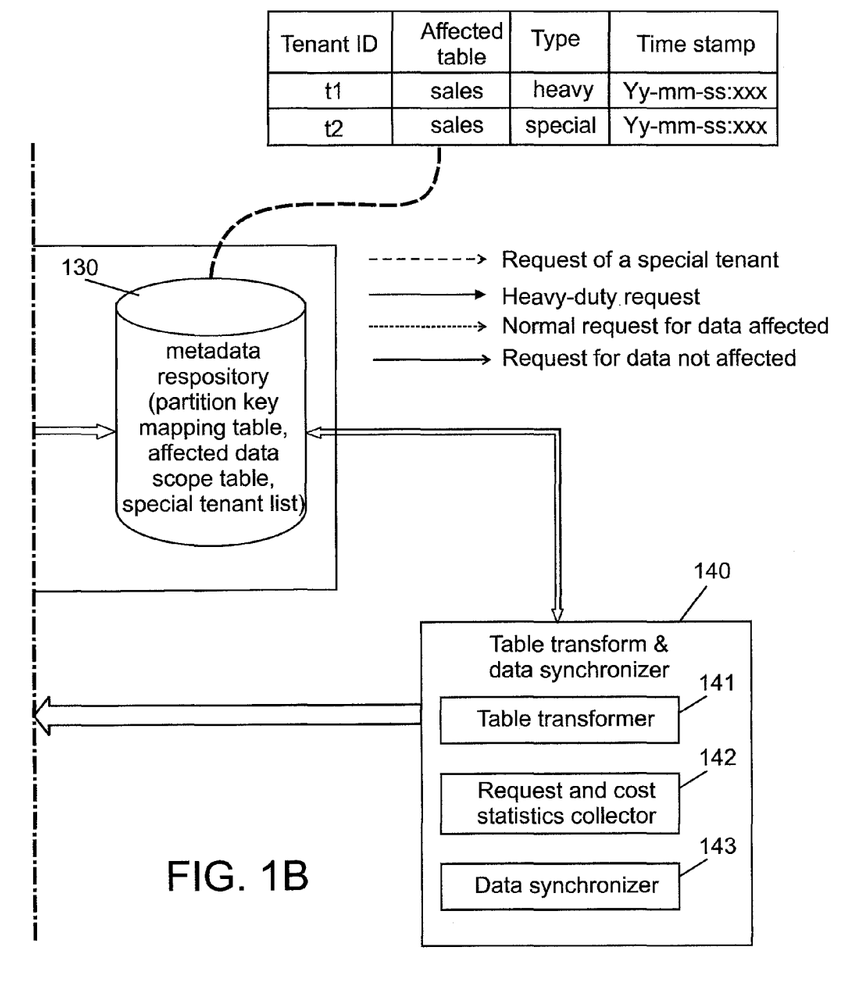

Now referring to FIG. 1, a system 100 is illustrated for isolating performance influence of application database operations among SaaS tenants according to an embodiment of the present invention. As shown, the system 100 resides between a SaaS application and a partitioned database management system, and preferably is implemented at least partially in a database driver or a wrapper thereof, e.g., a JDBC (Java Database Connectivity) wrapper. The partitioned database system is any partitioned database system known in the art, and includes a normal database partition for storing normal tenant data, and a heavy-duty database partition for storing tenant data generated by heavy-duty requests. The normal database partition and the heavy-duty database partition have different partition keys, e.g., the partition key of the normal database partition is PK=0, while the partition key of the heavy-duty request database partition is PK=1.

As shown, the system 100 for isolating performance influence of application database operations among SaaS tenants may comprise an analyzer 110, a request processor 120, a metadata repository 130 and a table transform & data synchronizer 140, wherein the request processor 120 may further comprise a normal request processor 121, a heavy-duty request processor 122, and optionally comprises a special tenant processor 123. The metadata repository 130 may store a partition key mapping table, an affected data scope table, and optionally store a special tenant list, etc. The table transform & data synchronizer 140 may comprise a table transformer 141, a data synchronizer 143, and optionally comprise a request and cost statistics collector 142.

The request analyzer 110 is for analyzing a database operation request from the SaaS application, identifying whether the request is a normal request or a heavy-duty request. Optionally, the request analyzer 110 further determines whether the request is a request from a special tenant. Then, the request analyzer 110 sends the analyzed and identified, and optionally determined request to a respective module to perform respective subsequent processing, e.g., sending a normal request to the normal request processor 121 to be processed, sending a heavy-duty request to the heavy-duty request processor 122 to be processed, and sending a request from a special tenant to the special tenant processor 123 to be processed. A normal request refers to a request that will not bring heavy burden to the database management system, a heavy-duty request refers to a request that will bring heavy burden to the database management system, while a special tenant refers to a tenant frequently issuing heavy-duty requests.

The request analyzer 110 may use various methods to identify whether the database operation request from the SaaS application is a normal request or a heavy-duty request. For example, the developer of the SaaS application may register in advance the heavy-duty SQL statements, which will bring heavy burdens to the database management system, into the metadata repository 130. Thus the request analyzer 110 may determine whether the current request is a heavy-duty request by comparing the SQL statement contained in the current request with the SQL statements registered in the metadata repository 130. As another example, the developer of the SaaS application may set specific transactions that will probably cause heavy database system processing load in the application as heavy duty transactions through an AOP (Aspect-Oriented Programming) mechanism or simple programming. Thus, the request analyzer 110 may determine whether the current transaction is a heavy-duty transaction by reading the setting, and thereby determine whether the current request is a heavy-duty request.

Optionally, the request and cost statistics collector 142 may collect the access statistic information on database access operations of tenants, including the tenant ID, SQL, response time, data size, etc. of every access, identify therefrom the tenants that frequently issue heavy-duty requests, and record these tenants as special tenants in the special tenant list of the metadata repository. In this way, the request analyzer 110 can determine whether the current request is a request from a special tenant by comparing the tenant issuing the current request with the special tenant list in the metadata repository.

The request analyzer 110 may identify a non-heavy-duty request as a normal request, and optionally, it may identify all the other requests that are neither heavy-duty requests nor requests from the special tenants as normal requests.

The normal request processor 121 is for processing normal database operation requests from the SaaS application sent by the request analyzer 110. In response to receiving a normal request, the normal request processor 121 first determines whether the data requested to be operated belong to an affected data scope by reading the affected data scope table in the metadata repository. If it is determined that the data requested to be operated do not belong to the affected data scope, indicating that the data requested to be operated is only in (and will only be in) the normal database partition, then the normal request processor 121 adds the partition key of the normal database partition to the SQL statement in the request, and sends the request to the partitioned database management system, so that the partitioned database management system can automatically route the request to the normal database partition to perform corresponding operations according to the partition key. If it is determined that the data requested to be operated belong to the affected data scope, indicating that the data requested to be operated is at least in the heavy-duty database partition, then the normal request processor 121 does not add the partition keys of the normal database partition and of the heavy-duty request database partition to the SQL statement in the request, and sends the request to the partitioned database management system, so that the partitioned database management system automatically routes the request to the normal database partition as well as the heavy-duty database partition to perform corresponding operations.

The heavy-duty request processor 122 is for processing heavy-duty database operation requests from the SaaS application sent by the request analyzer 110. In response to receiving a heavy-duty request, the heavy-duty request processor 122 further records the data scope affected by the request into the metadata repository. In addition, the heavy-duty request processor 122 determines whether the heavy-duty request is a data insertion request. If the heavy-duty request is a data insertion request, the heavy-duty request processor 122 adds the partition key of the heavy-duty request database partition to the SQL statement in the request, and sends the request to the partitioned database management system so that the partitioned database management system can automatically route the request to the heavy-duty database partition to perform corresponding data insertion operations according to the partition key. If the heavy-duty request is not a data insertion request, e.g., a data read or update request, the heavy-duty request processor 122 does not add the partition keys of the normal database partition or of the heavy-duty database partition to the SQL statement in the request, and sends the request to the partitioned database management system, so that the partitioned database management system can automatically route the request to the heavy-duty database partition and the normal database partition to perform corresponding data update and read operations respectively.

Optionally, the special tenant processor 123 is for processing database operation requests from special tenants sent by the request analyzer 110. In response to receiving a request from a special tenant, the special tenant processor 123 adds the partition key of the heavy-duty request database partition to the SQL statement in the request, and then sends the request to the partitioned database management system, so that the partitioned database management system can automatically route the request to the heavy-duty management system to perform corresponding operations.

The affected data scope table in the metadata repository 130 is for recording the scope of data affected by a heavy-duty request, that is, the scope of data stored in the heavy-duty request database partition. The scope of affected data can be differentiated by tenants of the SaaS application, database tables or other database operations of finer granularity or the combination thereof. For example, FIG. 1 exemplifies the contents of an affected data scope table, which shows that the tenant t1 and the database table, sales, is an affected data scope, indicating that the data in the table of sales of tenant t1 is stored in the heavy-duty request database partition; the type "heavy duty" indicates that the affected data scope is generated by a heavy duty request, and the time stamp shows the time of generating the corresponding data in the heavy-duty request database; in addition, it is shown that the tenant t2 and the database table, sales, is another affected database scope, indicating that data in the table of sales of tenant t2 are stored in the heavy-duty request database partition, and the type "special" indicates that the affected data scope is generated according to a special tenant, and the time stamp shows the time of generating the corresponding data in the heavy-duty request database partition.

The table transformer 141 is for modifying the database tables in the normal database partitions, so as to add a partition key field to each database table, and for duplicating the structures of the database tables in the normal database partition into the heavy-duty request database partition. The table transformer 141 may execute the above operations in a preparation phase, e.g., when the SaaS application is installed.

The request and cost statistics collector 142, as described above, is for identifying special tenants that frequently issue heavy-duty requests by collecting the statistic information on the database operation requests of tenants, and for storing the special tenants in the special tenant list of the metadata repository.

The data synchronizer 143 causes data in a partition to be automatically moved to another partition by modifying the partition key of the data in the partition. For example, the data synchronizer 143 may modify the partition key of the data in the heavy-duty request database partition when the system is idle to make the partitioned database management system automatically synchronize the data to the normal partition according to the modified partition key, and modify the affected data scope table in the metadata repository to reflect the current data status, e.g., deleting the affected data scope related to the data which have been synchronized to the normal database partition. After the synchronization, a future access request to the corresponding data only needs to be routed to the normal database partition, without being routed to the heavy-duty database partition, making the system more efficient.

In addition, the data synchronizer 143 can move the data of a special tenant as identified by the request and cost statistics collector 142 from the normal database partition to the heavy-duty database partition by modifying the partition key of the data of the special tenant in the normal database partition.

Above are described embodiments of the present invention by referring to the accompanying drawings. It should be noted that the above descriptions are only exemplary illustrations, and not limitations to the present invention. The embodiments of the present invention can have more, less or different modules; and the containment and connection relationships among different modules can be different from what is described. For example, in some embodiments of the present invention, two or more heavy-duty request database partitions can be included; in some other embodiments of the present invention, the special tenant processor 123 and the functions of identifying and processing special tenants may no be included, and so on. All these variations are within the spirit and scope of the present invention.

Figure 2:
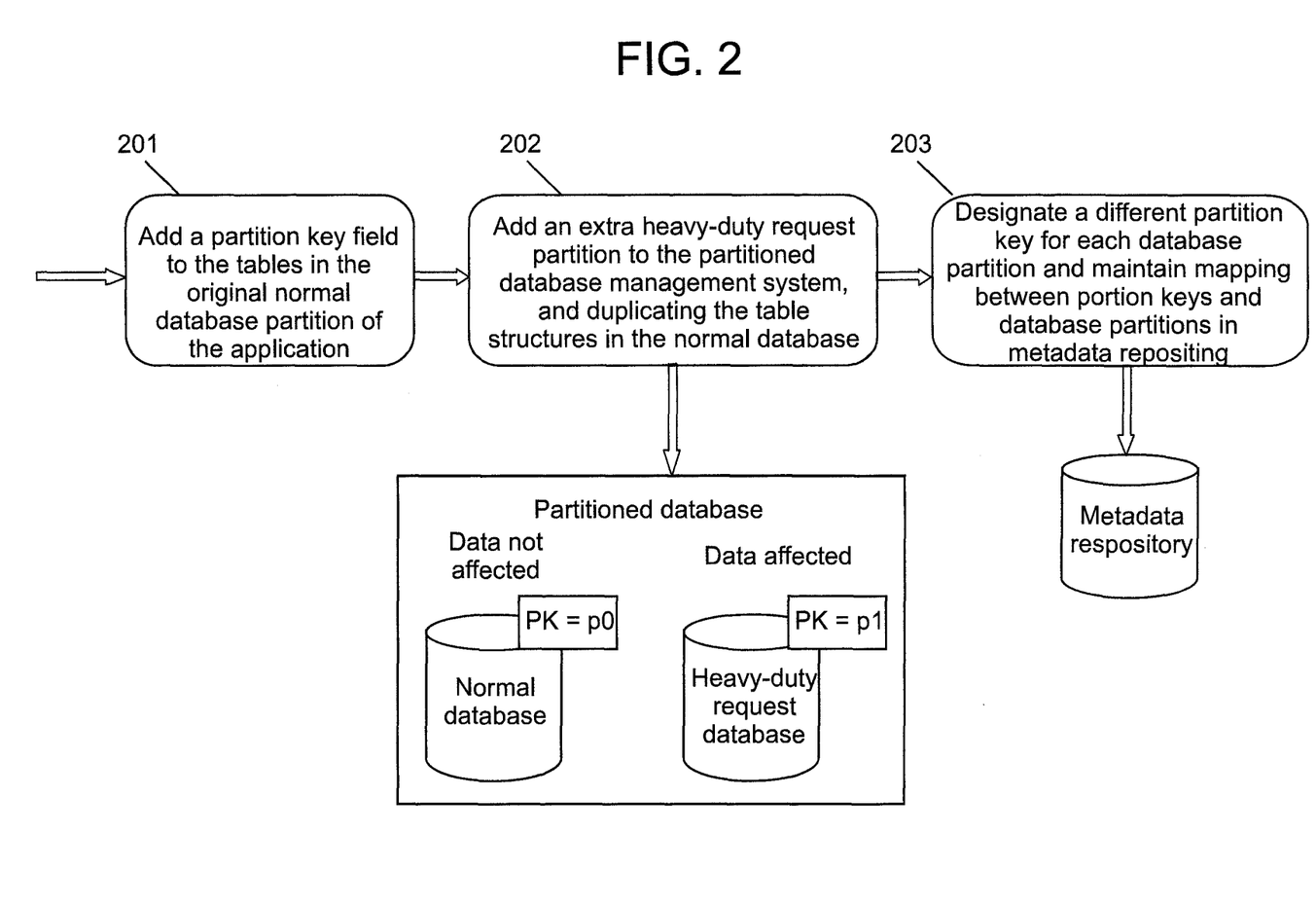
FIG. 2 is a flow diagram of a preparation phase of a method for isolating performance influence of application database operation among SaaS tenants according to an embodiment of the present invention.

Now referring to FIG. 2, a flow diagram shows the preparation phase of a method for isolating performance influence of application database operations among SaaS tenants according to an embodiment of the present invention. The preparation phase can be performed before the SaaS application starts, e.g., when the SaaS application is installed. As shown, the preparation phase includes the following steps.

In step 201, a partition key field is added to the database tables for storing tenant data of the SaaS application.

In step 202, an extra heavy-duty request database partition is added to the partitioned database management system of the SaaS application, resulting in the partitioned database management system including: the original normal database partition and the newly added heavy-duty request database partition, and the database tables for storing tenant data in the normal database partitions are duplicated to the heavy-duty request database partition.

In step 203, a different partition key is designated for each database partition, and the mapping between the partition keys and the database partitions is maintained in the metadata repository.

Steps 201, 202, and 203 can be executed by the table transformer 141 described above.

Figure 3:
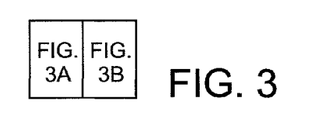
FIG. 3 is a flow diagram of a runtime phase of a method for isolating performance influence of application database operations among SaaS tenants according to an embodiment of the present invention.
Figure 3A:
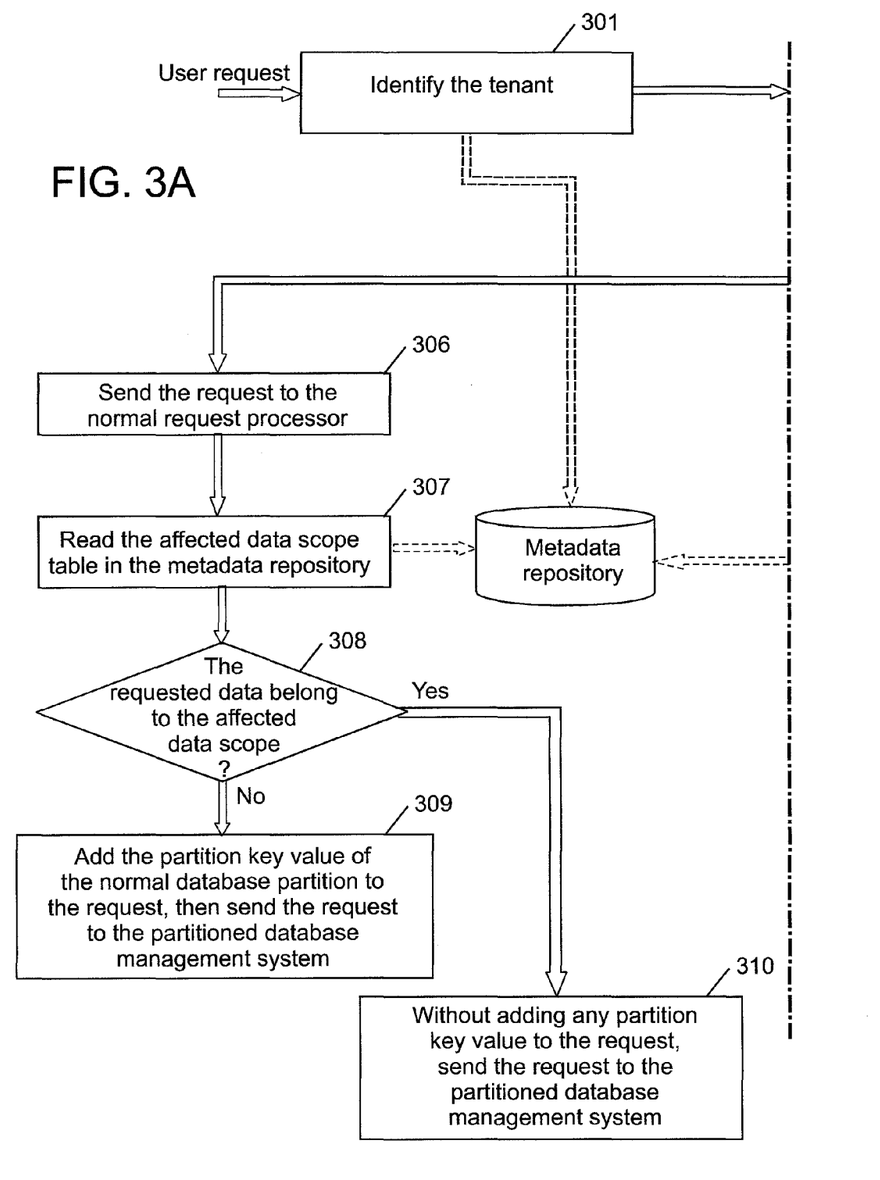
Figure 3B:
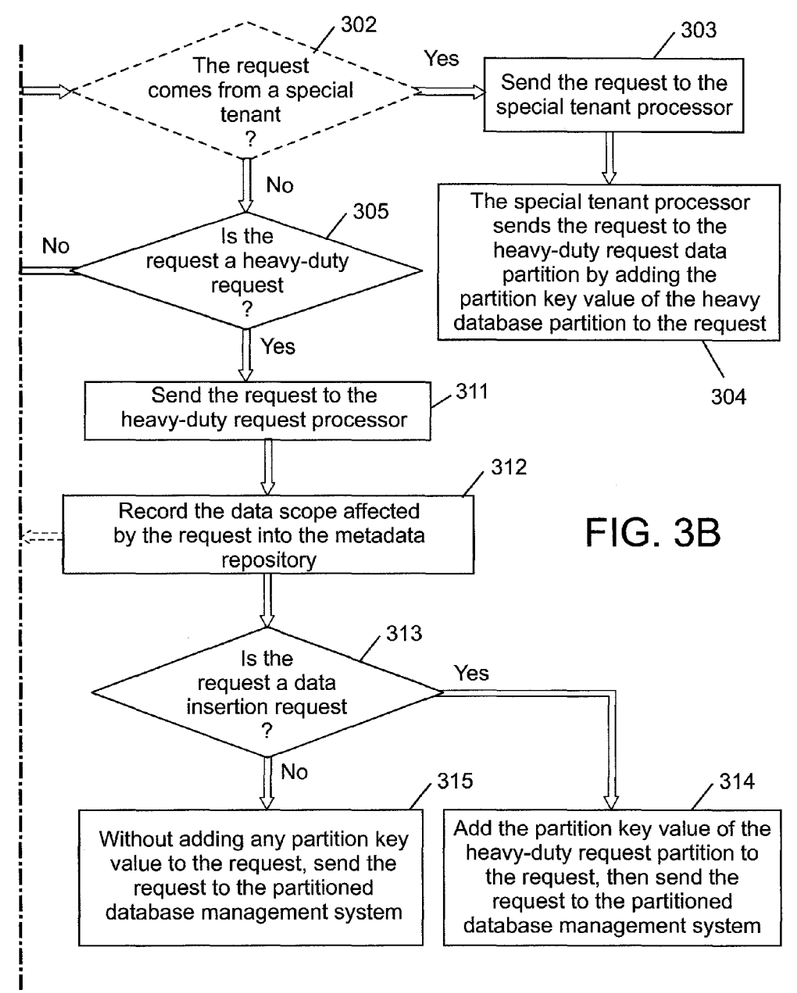

Now referring to FIG. 3, a flow diagram shows a runtime phase of the method for isolating performance influence of the application database operations among SaaS tenants. This phase can be executed while the SaaS application is running. As shown, the runtime phase includes the following steps.

In step 301, in response to receiving a request from a tenant, the tenant sending the request is identified.

In an optional step 302, it is determined whether the request is from a special tenant by comparing the identified tenant with a special tenant list in the metadata repository.

In response to a determination that the tenant making the request is a special tenant, optional steps 303 and 304 are performed. In response to the determination being no, step 305 is performed.

In the optional step 303, the request is sent to the special tenant processor to be processed.

In the optional step 304, the special tenant processor adds a partition key of the heavy-duty database partition to the request, e.g., adding the partition keys as a conditional clause into the SQL statement of the request, so that the partitioned database management system can automatically send the request to the heavy-duty request database partition to be processed.

In step 305, it is determined whether or not the request is a heavy-duty request. If the determination is no, step 306 is performed; if the determination is yes, step 311 is performed.

In step 306, the request is sent to the normal request processor.

In step 307, the normal request processor reads the affected data scope table in the metadata repository.

In step 308, the normal request processor determines whether the data involved in the request belongs to the affected data scope according to the affected data scope table. If the determination is no, step 309 is performed; if the determination is yes, step 310 is performed.

In step 309, since the data involved in the request do not belong to the affected data scope, indicating that the data only exist in the normal database partition and not in the heavy-duty database partition, the partition key of the normal database partition is added to the request. For example, the partition key is added to the SQL statement of the request as a conditional clause. Then the request is sent to the partitioned database management system, so that the partitioned database management system can automatically route the request to the normal database partition to be processed according to partition key.

In step 310, since the data involved in the request do belong to the affected data scope, indicating that the data at least exist in the heavy-duty request database partition, the partition keys of the normal database partition and of the heavy-duty request database partition are not added to the SQL statement of the request, and the request is sent directly to the partitioned database management system, so that the partitioned database management system can automatically route the request to the normal database partition as well as the heavy-duty request database partition.

In step 311, the request is sent to the heavy-duty request processor.

In step 312, the heavy-duty processor updates the affected data scope table in the metadata repository to record the data scope affected by the current request into the affected data scope table.

In step 313, the heavy-duty request processor determines whether the request is a data insertion request. If the determination is yes, step 314 is performed; if the determination is no, step 315 is performed.

In step 314, the heavy-duty request processor adds the partition key of the heavy-duty request database partition to the request, e.g., adding the partition key into the SQL statement of the request as a conditional clause, and then sends the request to the partitioned database management system, so that the partitioned database management system can automatically route the request to the heavy-duty database partition to be processed according to the partition key.

In step 315, the heavy-duty request processor does not add the partition keys of the normal database partition or of the heavy-duty request database partition to the SQL statement of the request, and sends the request to the partitioned database management system, so that the partitioned database management system can automatically route the request to the normal database partition as well as the heavy-duty database partition to be processed.

In some embodiments of the invention, the above steps 313 and 315 may not be included. Rather, step 314 is performed after step 312. In addition, in some embodiments of the invention, step 312 can be performed after step 314 or 315.

Figure 4:
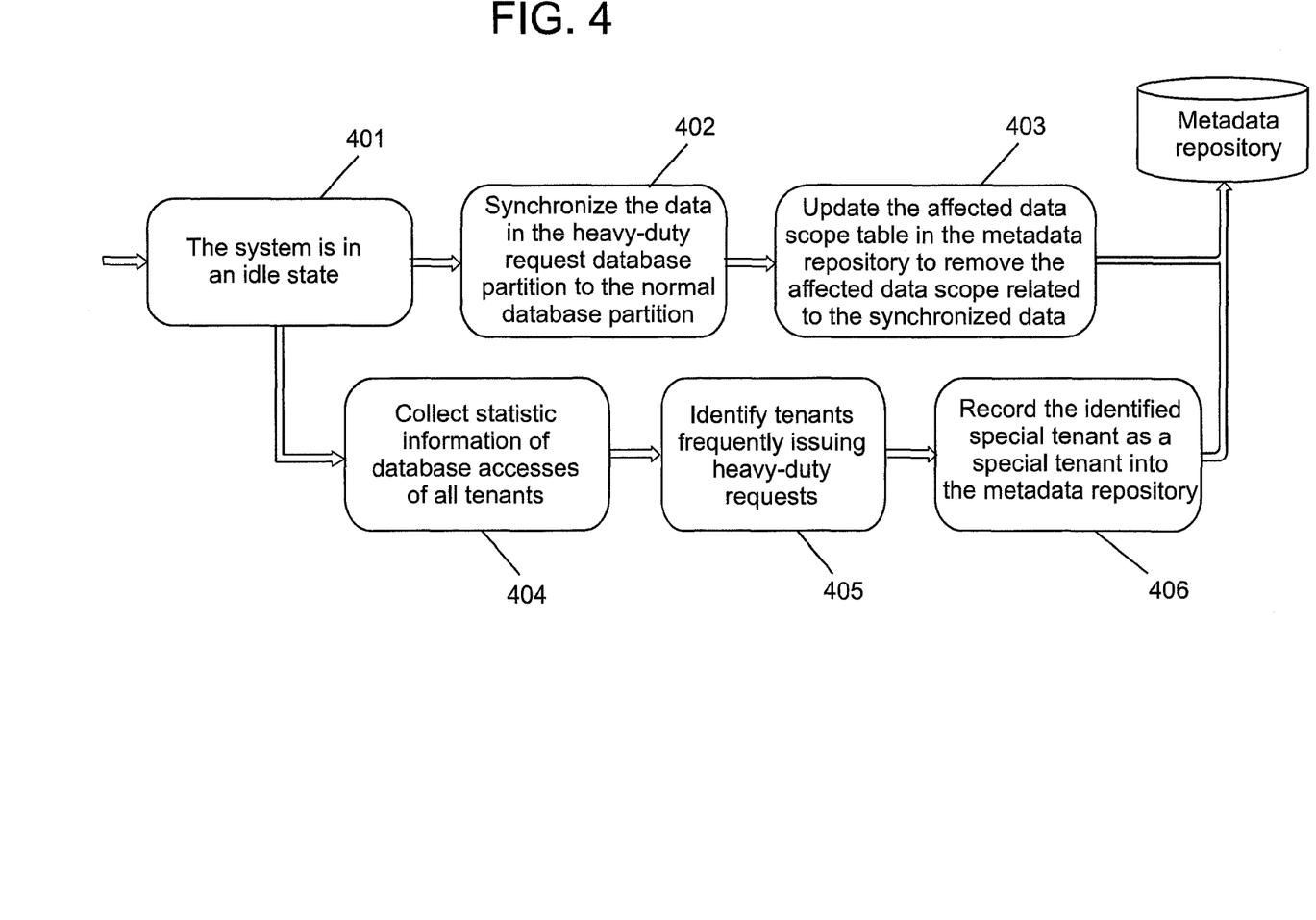
FIG. 4 is a flow diagram of an offline processing phase of a method for isolating performance influence of application database operations among SaaS tenants according to an embodiment of the present invention.

Now referring to FIG. 4, a flow diagram shows an offline process phase of the method for isolating performance influence of application database operations among SaaS tenants according to an embodiment of the present invention. As shown, the phase includes the following steps.

In step 401, the system is in an idle state. Subsequently, steps 402 and 404 are performed respectively.

In step 402, the data synchronizer causes the partitioned database management system to automatically synchronize the data in the heavy-duty database partition to the normal database partition, by modifying the partition key of the data in the heavy-duty database partition into the partition key of the normal database partition.

In step 403, the affected data scope table in the metadata repository is updated to remove the affected data scope related to the synchronized data.

In step 404, the request and cost statistics collector collects the statistic information on the database accesses of all tenants, including tenant IDs, SQL statements, response times, data sizes, etc.

In step 405, the request and cost statistics collector identifies a special tenant that frequently issues heavy-duty requests according to the collected statistic information.

In step 406, the identified tenant is stored in a special tenant list of the metadata repository as a special tenant.

Above is described the method for isolating the performance influence of application database operations among SaaS tenants according to an embodiment of the present invention. It should be noted that the above description is only exemplary, not limitation to the present invention. In other embodiments of the invention, the method can have more, less or different steps. For example, in some embodiments of the present invention, step 302 for determining whether the request is from the special tenant, as well as the corresponding processing steps 303 and 304 for the special tenant may not be included; in some embodiments of the present invention, step 306 for sending the request to the normal request processor, step 311 for sending the request to the heavy-duty request processor and step 303 for sending the request to the special tenant processor may not be included, rather, the request is processed directly according to the analysis of the request; in addition, the above steps may be merged and generalized, e.g., the above steps 313, 314, 315 may be merged into one step, in which, if the database operation request is a heavy-duty request, then the database operation request is routed to the heavy-duty partition for processing heavy-duty requests, etc. All these variations are within the spirit and scope of the present invention.

The present invention can be implemented in hardware, software, or a combination thereof. The present invention can be implemented in a computer system in a centralized manner, or in a distributed manner, in which, different components are distributed in some interconnected computer system. Any computer system or other devices suitable for executing the method described herein are appropriate. A typical combination of hardware and software can be a computer system with a computer program, which, when loaded and executed, controls the computer system to execute the method of the present invention, and constitute the apparatus of the present invention.

The present invention can also be embodied in a computer program product, comprising a computer readable storage medium with a computer program or program modules encoded thereon. The program can implement all the features of the method described herein, and when loaded into a computer system, can execute the method.

Although the present invention has been illustrated and described with reference to the preferred embodiments, those skilled in the art will understand that various changes both in form and details may be made thereto without departing from the spirit and scope of the present invention.

The invention claimed is:

1. A method for processing database operation requests, comprising:
   a computer receiving a database operation request from a user;
   the computer determining whether the database operation request is a heavy-duty request by comparing at least one parameter of the request with a predefined heavy-duty value for the at least one parameter;
   if the database operation request is a heavy-duty request, the computer routing the database operation request to a heavy-duty request database partition for processing heavy-duty requests to be processed, and recording the data scope affected by the database operation request into a metadata repository;
   wherein the heavy-duty request data partition is set besides an original normal database partition;
   determining whether the database operation request is from a special tenant frequently issuing heavy-duty requests, wherein the data of the special tenant is duplicated from the normal database partition to the heavy-duty database partition;
   if the database operation request is from the special tenant, adding a partition key of the heavy-duty request database partition to the database operation request;
   sending the database operation request with the added partition key to a management system for the partitioned database; and
   when the system is idle, synchronizing the data in the heavy-duty request database partition to the normal database partition.

2. The method of claim 1, wherein the normal database partition and the heavy-duty database partition have the same table structure including a partition key field, and the normal database partition and the heavy-duty request database partition have different partition keys.

3. The method of claim 2, wherein routing the database operation request to the heavy-duty request database partition for processing heavy-duty requests to be processed comprising:
   adding the partition key of the heavy-duty database partition to the database operation request; and
   sending the database operation request with the added partition key to a management system for the partitioned database.

4. The method of claim 2, further comprising:
   if the database operation request is not a heavy-duty request, further determining whether the data involved in the database operation request belong to the affected data scope recorded in the metadata repository; and
   if the data involved in the database operation request belong to the affected data scope recorded in the metadata repository, sending the database operation request to the partitioned database management system without adding the partition keys of the normal database partition or of the heavy-duty request database partition to the database operation request.

5. The method of claim 4, further comprising:
   if the data involved in the database operation request do not belong to the affected data scope recorded in the metadata repository, adding the partition key of the normal database partition to the database operation request, and sending the database operation request with the added partition key to the partitioned database management system.

6. The method of claim 2, wherein routing the data operation request to the heavy-duty database partition for processing heavy-duty requests to be processed comprises:
   determining whether the database operation request is a data insertion request;
   if the database operation request is a data insertion request, adding the partition key of the heavy-duty database partition to the database operation request; and
   sending the database operation request with the partition key added to the partitioned database management system.

7. The method of claim 6, further comprising:
   if the database operation request is not a data insertion request, sending the database operation request to the partitioned database management system without adding the partition keys of the normal database partition or of the heavy-duty database partition to the database operation request.

8. The method of claim one wherein the at least one parameter is an SQL statement in the request and the predetermined value is an SQL statement registered in a metadata repository.

9. The method of claim one wherein the at least one parameter is a tenant identification of a requestor of the request and the predetermined value is a tenant identification registered in a metadata repository based on past usage.

10. A system, at least partly implemented in hardware, for processing database operation requests, comprising:
    a request analyzer receiving a database operation request from a user and determining whether the database operation request is a heavy-duty request by comparing at least one parameter of the request with a predefined heavy-duty value for the at least one parameter;
    a request processor routing the database operation request to a heavy-duty request database partition for processing heavy-duty requests to be processed and recording the data scope affected by the database operation request into a metadata repository, if the database operation request is a heavy-duty request;
    wherein the heavy-duty request database partition is set besides a normal database partition;
    wherein the request analyzer further determines whether the database operation request is from a special tenant frequently issuing heavy-duty requests, and if the request is from a special tenant duplicating the data of the special tenant from the normal database partition to the heavy-duty database partition;
    the request processor further adds the partition key of the heavy-duty request database partition to the database operation request and sends the database operation request with partition key added to a management system the partitioned database if the database operation request is from the special tenant; and
    a data synchronizer that synchronizes the data in the heavy-duty request database partition to the normal database partition when the system is idle.

11. The system of claim 10, wherein the normal database partition and the heavy-duty database partition have the same table structure including a partition field, and the normal database partition and the heavy-duty request database partition have different partition keys.

12. The system of claim 11, wherein the request processor comprises:
   means for adding the partition key of the heavy-duty request database partition to the database operation request; and
   means for sending the database operation request with the partition key added to a management system for the partitioned database.

13. The system of claim 11, wherein the request processor further comprises:
   means for, if the database operation request is not a heavy-duty request, further determining whether the data involved in the database operation request belong to the affected data scope recorded in the metadata storage; and
   means for, if the data involved in the database operation request belong to the affected data scope recorded in the metadata repository, sending the data operation request to the partitioned database management system without adding the partition keys of the normal database partition or of the heavy-duty request database partition to the database operation request.

14. The system of claim 13, wherein the request processor further comprises:
   means for, if the data involved in the database operation request do not belong to the affected data scope recorded in the metadata repository, adding the partition key of the normal database partitions to the database operation request, and sending the database operation request with the added partition key to the partitioned database management system.

15. The system of claim 11, wherein the request processor comprises:
   means for determining whether the database operation request is a data insertion request;
   means for, if the database operation request is a data insertion request, adding the partition key of the heavy-duty database partition to the database operation request; and
   means for sending the database operation request with the added partition key to the partitioned database management system.

16. The system of claim 15, wherein the request processor further comprises:
   means for, if the database operation request is not a database insertion request, sending the database operation request to the partitioned database management system without adding the partition keys of the normal database partition or of the heavy-duty database partition to the database operation request.

17. A computer program product comprising:
   A non-transitory computer readable storage medium; and
   computer usable code stored on the non-transitory computer readable storage medium, where, if executed by a processor, the computer usable code causes a computer to:
      receive a database operation request from a user;
      compare at least one parameter of the request with a predefined heavy-duty value for the at least one parameter to determine whether the database operation request is a heavy-duty request;
      if the database operation request is a heavy-duty request:
         route the database operation request to a heavy-duty request database partition for processing heavy-duty requests to be processed;
         record the data scope affected by the database operation request into a metadata repository;
      determine whether the database operation request is from a special tenant frequently issuing heavy-duty requests, the data of the special tenant duplicated from a normal database partition to the heavy-duty database partition;
      add a partition key of the heavy-duty request database partition to the database operation request if the database operation request is from the special tenant;
      send the database operation request with the added partition key to a management system for the partitioned database; and
      synchronize the data in the heavy-duty request database partition to the normal database partition when the system is idle.

* * * * *